United States Patent Office 3,136,775
Patented June 9, 1964

3,136,775
PREPARATION OF 5,5'-TRIMETHYLENEBISHY-DANTOIN FROM 2,6-DICYANOPIPERIDINE
Norman L. Hause, Wilmington, Del., assignor to E. I. du Pont de Nemours and Company, Wilmington, Del., a corporation of Delaware
No Drawing. Filed Apr. 2, 1962, Ser. No. 184,556
6 Claims. (Cl. 260—309.5)

This invention relates to the preparation of 5,5'-trimethylenebishydantoin and more particularly to its preparation from 2,6-dicyanopiperidine.

The above bishydantoin can be hydrolyzed by heating it with an aqueous solution of a strong acid or base to obtain alpha,epsilon-diaminopimelic acid. The latter can be converted to L-lysine by the method described in Gorton and Hause U.S. Patent 2,976,218. Thus, the bishydantoin is valuable as an intermediate in the production of the essential amino acid, L-lysine.

It is an object of the present invention to provide a method of preparing 5,5'-trimethylenebishydantoin. A particular object is to provide a method for its preparation from 2,6-dicyanopiperidine. Further objects will be apparent from the following description.

The objects of the invention are accomplished by reacting 2,6-dicyanopiperidine, ammonia and carbon dioxide in an inert, liquid polar reaction medium such as water, a lower alcohol or a mixture thereof. The preferred reaction medium is water.

The reaction can be represented as follows:

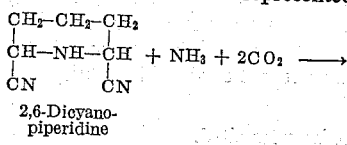

2,6-Dicyano-piperidine

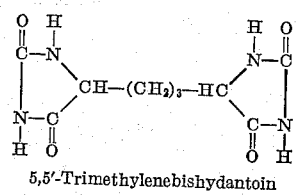

5,5'-Trimethylenebishydantoin

As indicated above, the reaction to produce the bishydantoin involves an opening of the ring of the dicyanopiperidine reactant. That such ring-opening would occur under hydantoin-forming conditions could not have been predicted. Henry, J. Org. Chem., 24, 1363 (1959), discloses that hydrolysis of the dicyanopiperidine with cold 95% sulfuric acid gave piperidine-2,6-dicarboxamide while my coworkers had found that its hydrolysis with boiling mineral acid or alkali yields the corresponding piperidine-dicarboxylic acid. These results indicate a high degree of stability for the ring structure of dicyanopiperidine. Furthermore, stability of this ring structure under conditions of hydantoin formation would have been expected in view of Dakin, J. Biological Chem., 44, 499–529 (1920), who reported (page 527) that proline is converted by reaction with aqueous potassium cyanate to the bicyclic compound, proline hydantoin, in which the ring derived from proline remains unopened. In view of these findings of prior workers, my discovery that dicyanopiperidine can be reacted with ammonia and carbon dioxide to give trimethylenebishydantoin in high yields was entirely unexpected.

The dicyanopiperidine reactant may be obtained in any desired manner. Thus, it may be prepared by the method described by Henry, J. Org. Chem., 24, 1363 (1959), or by that described in the pending application of Rogers, Ser. No. 764,514, filed October 1, 1958. The latter method involves the reaction of glutaraldehyde dicyanhydrin and ammonia. When preparing the glutaraldehyde dicyanhydrin from glutaraldehyde obtained by the hydrolysis of 2-ethoxy-3,4-dihydro-2H-pyran, a typical preparation may involve: A mixture of the ethoxy-dihydropyran (0.1 mole), water (130 g.) and concentrated hydrochloric acid (0.2 ml.) is stirred at room temperature until a clear solution of glutaraldehdye is obtained. The solution is made basic (pH about 10) by the addition of sodium hydroxide and cooled in an ice bath. Liquid hydrogen cyanide (0.2 mole) is added with stirring. After about 2 hours to complete the reaction, concentrated aqueous ammonia (2.0 moles) is added. After standing overnight, the precipitated crystalline 2,6-dicyanopiperidine (0.022 mole) is separated. Considerably more of the compound can be recovered by partially evaporating the mother liquor.

The ammonia (hydrous or anhydrous) and carbon dioxide reactants can be supplied as such to the reaction medium. However, they can also be supplied, either in whole or in part, in the form of ammonium bicarbonate, ammonium carbonate or ammonium carbamate, the use of which may be convenient in small scale operations. For large scale operations, the use of ammonia and carbon dioxide as such is generally preferred for economic reasons.

The proportions of the reactants can be varied considerably but there will generally be employed from 1 to 20 moles of ammonia and from 2 to 20 moles of carbon dioxide per mole of the dicyanopiperidine. The preferred proportions correspond to from 10 to 13 moles of ammonia and from 8 to 11 moles of carbon dioxide per mole of the dicyanopiperidine.

The reaction will occur at fairly low temperatures such as room temperature but only at slow rates. It is accordingly preferred to effect the reaction at an elevated temperature, for example, one in the range 75° C. to 150° C. Temperatures higher than 150° C. will generally not be used since at such higher temperatures decomposition of the product may become excessive. The most preferred temperatures range from about 95° C. to 125° C. Reaction times of from about 1 to 5 hours or somewhat longer are generally effective, the shorter times being employed with the higher temperatures. The reaction mixture will generally be maintained under pressure, e.g. autogenous pressure, simply for the purpose of maintaining the ammonia and carbon dioxide reactants in solution.

It is generally preferred to prepare an aqueous mixture of the reactants at a temperature below that at which the reaction will proceed at a practical rate, and then to heat the mixture to a temperature within the range 75° C. to 150° C. in a closed pressure vessel. Instead of a batch-wise operation, the reaction can be carried out continuously. Thus, a mixture of the reactants or the reactants separately can be fed continuously to a reaction zone where they are mixed, if necessary, and heated to and maintained at the desired reaction temperature while a portion of the reacted mixture is continuously withdrawn from the reaction zone at a rate corresponding to the rate at which materials are fed to the zone. The rate of passage of material through the reaction zone should be such as to assure a residence time sufficient to effect a practical conversion of the reactants to the bishydantoin. A tube or pipe line reactor through which the reaction mixture can be pumped under pressure sufficient to maintain the reactants in solution, can be employed for such continuous operation.

The mixture resulting from the above reaction can be used directly, e.g. to effect hydrolysis of the bishydantoin contained therein to diaminopimelic acid. Alternatively, the bishydantoin can be recovered from the mixture. A convenient way of doing this is to strip the mixture of volatiles by heating it under vacuum. The crude bishydantoin so obtained can be used as such or it can be purified by recrystallization from water.

The invention is illustrated by the following examples in which percentages representing concentrations of reagents are percentages by weight.

Example 1

A pressure tube is charged at room temperature with water (50 ml.), 28% aqueous ammonia (25 ml., 0.38 mole $NH_3$) and 2,6-dicyanopiperidine (17.2 g., 0.127 mole). After stirring the resulting mixture, ammonium bicarbonate (85 g., 1.1 moles) is added. The tube is sealed, purged with nitrogen and its contents heated for 4 hours at 100° C. under autogenous pressure. The tube is then vented and its contents discharged into a rotary vacuum drier heated at 100° C. A sample of the dried crude 5,5'-trimethylenebishydantoin is recrystallized from water to give white crystals melting at 234°–240° C.

*Analysis.*—Calc'd: C, 45.0; H, 5.00; N, 23.3. Found: C, 44.52; H, 5.20; N, 22.64.

The above crude bishydantoin is hydrolyzed to alpha, epsilon-diaminopimelic acid by heating it for 4 hours at 150° C. with an amount of 65% sulfuric acid corresponding to 6 moles of $H_2SO_4$ per mole of the bishydantoin. The yield of the diaminopimelic acid is 81%, based upon the dicyanopiperidine charged.

Example 2

A pressure tube is charged at room temperature with water (32 ml.), 28% aqueous ammonia (16 ml., 0.24 mole) and 2,6-dicyanopiperidine (10.9 g., 0.081 mole). After stirring the resulting mixture, ammonium bicarbonate (54 g., 0.68 mole) is added. The tube charge is then reacted to yield the bishydantoin and the crude bishydantoin is hydrolyzed to diaminopimelic acid according to the method of Example 1. The yield of the latter, based upon the dicyanopiperidine charged, is 82%.

The embodiments of the invention in which an exclusive property or privilege is claimed are defined as follows:

1. The method of preparing 5,5'-trimethylenebishydantoin comprising reacting in an inert liquid polar reaction medium at a temperature from room temperature to 150° C. 2,6-dicyanopiperidine, ammonia and carbon dioxide, said ammonia and said carbon dioxide being supplied to said reaction medium in amounts of at least 1 mole of ammonia and at least 2 moles of carbon dioxide per mole of said 2,6-dicyanopiperidine.

2. The method of claim 1 wherein the reaction is effected at a temperature in the range 75° C. to 150° C.

3. The method of preparing 5,5'-trimethylenebishydantoin comprising reacting 2,6-dicyanopiperidine, ammonia and carbon dioxide under autogenous pressure at a temperature in the range 75° C. to 150° C. in a liquid reaction medium from the group consisting of water, a lower alcohol and mixtures thereof, said ammonia and said carbon dioxide being supplied to said reaction medium in amounts corresponding to from 1 to 20 moles of ammonia and from 2 to 20 moles of carbon dioxide per mole of said 2,6-dicyanopiperidine.

4. The method of claim 3 wherein ammonia and carbon dioxide are supplied to the reaction medium in amounts corresponding to from 10 to 13 moles of ammonia and from 8 to 11 moles of carbon dioxide per mole of 2,6-dicyanopiperidine.

5. The method of claim 4 wherein the reaction is effected at a temperature in the range 95° C. to 125° C.

6. The method of preparing 5,5'-trimethylenebishydantoin comprising reacting in an aqueous reaction medium under autogenous pressure at a temperature in the range 75° C. to 150° C. 2,6-dicyanopiperidine, ammonia and carbon dioxide, said ammonia and carbon dioxide being supplied to said reaction medium in amounts corresponding to from 1 to 20 moles of ammonia and from 2 to 20 moles of carbon dioxide per mole of said 2,6-dicyanopiperidine.

No references cited.